United States Patent [19]

Yamashita et al.

[11] 3,839,831

[45] Oct. 8, 1974

[54] METHOD FOR GRINDING THROW-AWAY TIP

[75] Inventors: Junnosuke Yamashita; Hideo Negishi, both of Tokyo, Japan

[73] Assignee: Mitsubishi Kinzoku Kogyo Kabushiki Kaisha, Chiyoda-ku, Tokyo-to, Japan

[22] Filed: Oct. 24, 1972

[21] Appl. No.: 300,258

[30] Foreign Application Priority Data
Oct. 29, 1971  Japan.............................. 46-85471

[52] U.S. Cl............................................ 51/281 R
[51] Int. Cl............................................ B24b 1/00
[58] Field of Search.......... 51/281 R, 288, 2 H, 2 Y, 51/74 R, 98 R, 102, 238 R, 238 S, 239, 240, 327

[56] References Cited
UNITED STATES PATENTS
2,805,523  9/1957  Springer.............................. 51/102
3,125,934  3/1964  Persson.............................. 51/102 X
3,341,976  9/1967  Pace .................................. 51/102

Primary Examiner—Donald G. Kelly
Attorney, Agent, or Firm—Wenderoth, Lind & Ponack

[57] ABSTRACT

A method for grinding a throw-away tip, wherein the tip to be ground is placed on the upper surface of a grinding table as the reference plane for the work piece with its bottom surface faced with the reference plane, a grind stone is provided at a position opposite the reference plane, and the grinding is carried out on this bottom surface of the tip.

1 Claim, 2 Drawing Figures

METHOD FOR GRINDING THROW-AWAY TIP

BACKGROUND OF THE INVENTION

A. Field of the Invention

This invention relates to a method for grinding a chip breaker or a negative land of a throw-away tip. More particularly, it is concerned with a method for grinding the throw-away tip, wherein the upper surface of a grinding table of a grinding machine, on which the tip is placed, is made a reference plane; then the tip is placed on it with the bottom surface thereof faced with this reference plane; a grinding wheel is disposed at a position to work the bottom surface of the tip; thereafter, the above-mentioned reference plane and the outer peripheral surface of the grinding wheel are aligned on the same line so as to establish the reference position for the grinding work; and finally a certain definite cutting depth is determined from the above-mentioned reference position to effect grinding of the tip.

B. Discussion of Prior Art

As well known in the prior art, throw-away cutting tips are commonly provided for machine tools such as a lathe. The cutting tip is separately manufactured and is secured to the tool in any known fashion. When the tip is worn down it is simply removed from the tool and thrown away. It has heretofore been a practice to perform grinding work of a throw-away tip to form on its surface a chip breaker or a negative land by making the upper surface of the throw-away tip placed on the grinding table a reference plane, based on which the cutting depth of the tip is determined. When the grinding work is carried out in this manner, however, fluctuation in thickness of the throw-away tip or the size of an inscribed circle definitely affect precision in the size of the finished work piece with the consequence that the position of the reference plane of the throw-away tip should be verified at every time the grinding work is to be carried out, and the cutting depth of the tip must be determined from this verified position, which operations are considered to be complicated and troublesome.

SUMMARY OF THE INVENTION

It is therefore the primary object of the present invention to provide an improved method for grinding the throw-away tip, which is free from the aforementioned disadvantages encountered heretofore, and is capable of carrying out the grinding work for the required chip breaker or negative land irrespective of thickness of the throw-away tip or precision in size of the inscribed circle.

The foregoing object of the present invention as well as its details of operation will become more apparent from the following description when read in conjunction with the accompanying drawing.

DETAILED DESCRIPTION OF THE INVENTION

Figure 1:
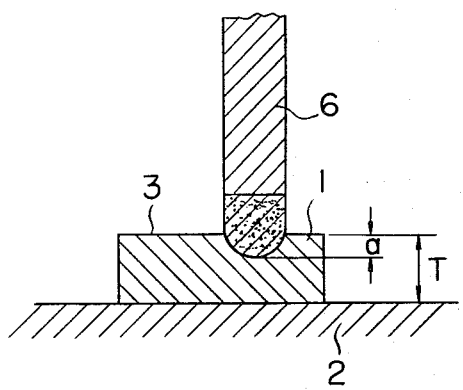
FIG. 1 is a schematic, cross-sectional diagram showing a conventional grinding method of a throw-away tip.
Figure 2:
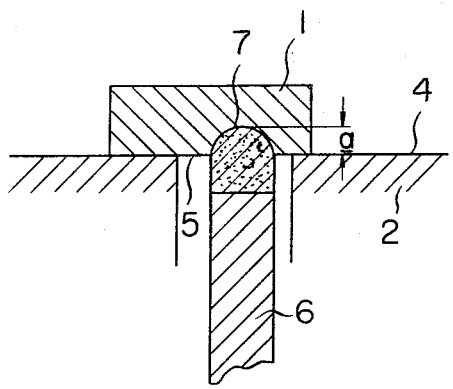
FIG. 2 is also a schematic, cross-sectional diagram showing the grinding method of a throw-away tip according to the present invention.

The invention will now be explained with reference to FIG. 2. The upper surface 4 of the grinding table 2 of a grinding machine is made a reference plane for a work piece, and a throw-away tip 1 is placed on this grinding table 2 with its bottom surface side 5 against the above-mentioned reference plane 4. Following this placement of the tip, a grinding wheel 6 is fitted at a position opposite the reference plane 4 defined by the upper surface of the grinding table so as to grind the bottom surface 5 of the tip 1, and the outer peripheral surface 7 of the grinding wheel 6 is aligned with the extension of the above-mentioned reference plane 4 to determine a reference position for the grinding work with the grinding wheel 6. When the reference position of the grinding wheel 6 is fixed, the throw-away tip 1 is then fixed on the reference plane 4 of the grinding table, and the grinding wheel 6, with its cutting depth $a$ having been predetermined from the above-mentioned reference position for the grinding, is actuated to form the chip breaker or negative land on the surface of the throw-away tip 1. The grinding wheel 6 to be used may be of different shape depending on the purpose of grinding.

As stated in the foregoing, the present invention provides the method for grinding a throw-away tip to form a chip breaker or negative land on its surface, wherein the upper surface 4 of the grinding table is made the reference surface for the grinding operation. The grinding wheel 6 is positioned on a side opposite to the location of the tip relative to the reference surface 4 of the above-mentioned grinding table and the outer peripheral surface of the grind stone 7 is arranged with the reference surface 4 theoretically extending across the slot in which the grinding wheel 6 is positioned to determine the reference position of the grinding wheel. Thereafter the required cutting depth of the grinding wheel is computed relative to the reference position for grinding, and finally the grinding wheel is actuated to cut the surface of the throw-away tip to the required depth.

Since the grinding method according to the present invention provides the grinding wheel at a position opposite the reference surface of the grinding table so as to grind the bottom surface part of the throw-away tip, the process of verifying the reference position for grinding on the upper surface of the throw-away tip at every time of the grinding which has so far been the case can be dispensed with. Also, once the required cutting size is initially established, the chip breaker or negative land of an identical shape can be continuouly formed with the consequence that precision and efficiency in the grinding operation can be remarkably increased. In view of these improved effects derived from the present method, the advantageous merit of the present invention in working the chip breaker or negative land on the surface of the throw-away tip is great.

What we claim is:

1. A method for grinding a workpiece, such as a throw-away cutting tip to be attached to a cutting tool, to form it into a predetermined shape, which comprises the steps of: providing a grinding table having a horizontal upper planar surface for serving as a reference plane and having a slot therein; placing said workpiece on said reference plane with the bottom surface thereof resting against the reference plane; positioning a grinding wheel having an annular peripheral surface in the slot in said grinding table and below said reference plane; aligning the top of said peripheral surface of said grinding wheel with said reference plane to establish a reference position for the grinding wheel for its grinding operation; and thereafter driving said grinding wheel from said reference position upwardly relative to said reference plane into said workpiece a predetermined distance equal to the cutting depth to which said workpiece is to be machined; to carry out the grinding operation.

* * * * *